(12) United States Patent
Hoang

(10) Patent No.: US 11,372,113 B2
(45) Date of Patent: Jun. 28, 2022

(54) METHODS FOR INITIALIZING A NAVIGATION SYSTEM WITHOUT HEADING INFORMATION AND DEVICES THEREOF

(71) Applicant: Orolia USA Inc., Rochester, NY (US)

(72) Inventor: Gia Minh Hoang, Palaiseau (FR)

(73) Assignee: Orolia USA Inc., Rochester, NY (US)

( * ) Notice: Subject to any disclaimer, the term of this patent is extended or adjusted under 35 U.S.C. 154(b) by 211 days.

(21) Appl. No.: 16/852,086

(22) Filed: Apr. 17, 2020

(65) Prior Publication Data

US 2021/0325546 A1 Oct. 21, 2021

(51) Int. Cl.
*G01S 19/42* (2010.01)
*G01S 19/39* (2010.01)
*G01S 19/52* (2010.01)

(52) U.S. Cl.
CPC ............ *G01S 19/42* (2013.01); *G01S 19/393* (2019.08); *G01S 19/52* (2013.01)

(58) Field of Classification Search
CPC ........ G01S 19/42; G01S 19/393; G01S 19/52; G01S 19/49; G01S 19/53; G01C 25/005; G01C 21/165
See application file for complete search history.

(56) References Cited

U.S. PATENT DOCUMENTS

| 7,512,493 B2 | 3/2009 | Morgan et al. |
| 9,491,585 B2 | 11/2016 | Huang et al. |
| 2007/0282528 A1* | 12/2007 | Morgan ............... G01C 21/165 |
| | | 701/510 |

FOREIGN PATENT DOCUMENTS

EP 1862764 A1 12/2007

OTHER PUBLICATIONS

Wikipedia, Kalman Filter (Year: 2020).*
Rupp, D. et al., "Extended Multiple Model Adaptive Estimation for the Detection of Sensor and Actuator Faults" Proceedings of the 44th IEEE Conference on Decision and Control, and the European Control Conference 2005 Seville, Spain, Dec. 12-15, 2005, pp. 3079-3084.

(Continued)

*Primary Examiner* — Alan D Hutchinson
(74) *Attorney, Agent, or Firm* — Troutman Pepper Hamilton Sanders LLP (Rochester)

(57) ABSTRACT

Methods, non-transitory computer readable medium and devices that initiating determination of navigation with an initial heading while in motion and without waiting for a stationary phase. Ongoing position-dependent data and/or velocity-dependent data of an object is/are received from a Global Navigation Satellite System (GNSS) receiver system or a position fixing system and from an inertial measurement unit (IMU). A weight associated with each of a plurality of filters is iteratively determined in an adaptive estimation model based on a match between position data and velocity data for each of the plurality of filters conditioned by filter heading data for each of the plurality of filters and the ongoing obtained position data and the velocity data of the object. An estimated heading of the object is determined based on the initial heading and the iteratively determined weight and the filter heading data associated with the filters

15 Claims, 6 Drawing Sheets

(56) References Cited

OTHER PUBLICATIONS

Hanlon, P. D. et al., "Multiple-Model Adaptive Estimation Using a Residual Correlation Kalman Filter Bank", IEEE Transactions on Aerospace and Electronic Systems vol. 36, No. 2 Apr. 2000, pp. 393-406.
Barrios, C. et al., "Multiple Model Framework of Adaptive Extended Kalman Filtering for Predicting Vehicle Location", Proceedings of the IEEE Itsc 2006 IEEE Intelligent Transportation Systems Conference Toronto, Canada, Sep. 17-20, 2006, pp. 1053-1059.
Wendel, J. et al., "A Performance Comparison of Tightly Coupled GPS/INS Navigation Systems Based on Extended and Sigma Point Kalman Filters," Navigation: JOIN, vol. 53, No. 1, 2006, pp. 21-31.
Hide Christopher et al: "Multiple Model Kalman Filtering for GPS and Low-cost INS Integration", GNSS 2004—Proceedings of the 17th International Technical Meeting of the Satellite Division of the Institute of Navigation (Ion GNSS 2004), The Institute of Navigation, 8551 Rixlew Lane Suite 360 Manassas, VA 20109, USA, Sep. 24, 2004 (Sep. 24, 2004), pp. 1096-1103, XP056009224.
Extended European Search Report, dated Aug. 18, 2021.

* cited by examiner

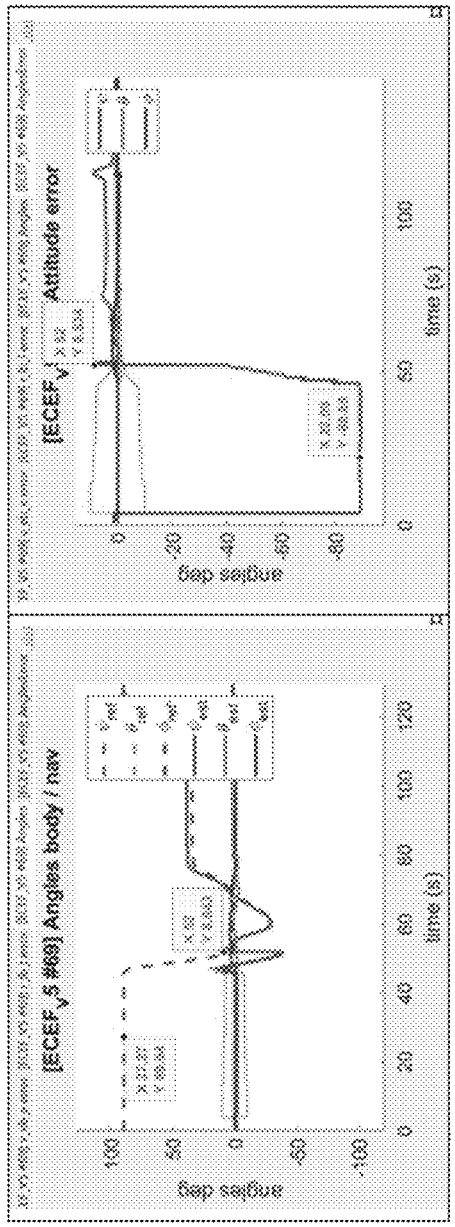
FIG. 4A
FIG. 4B
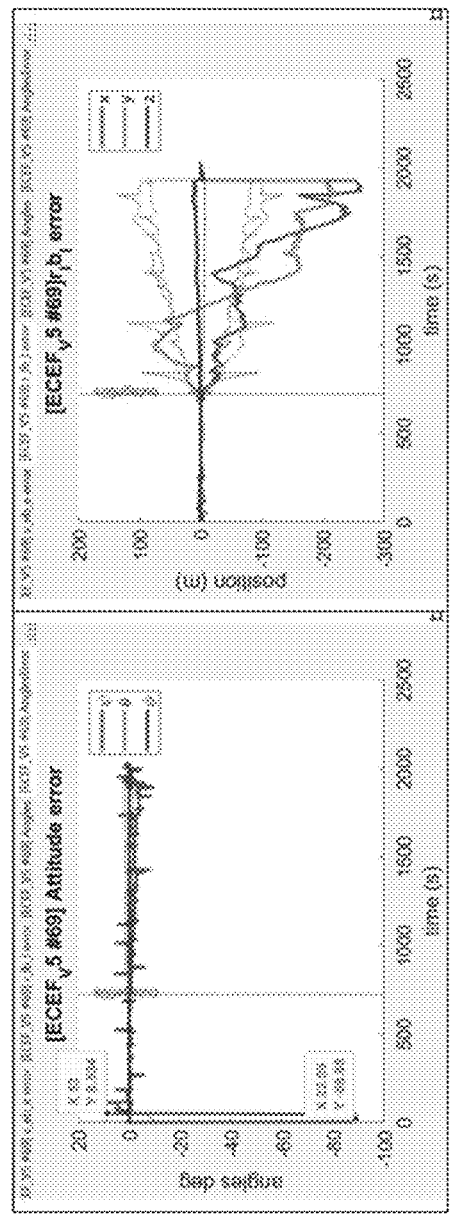
FIG. 5A
FIG. 5B

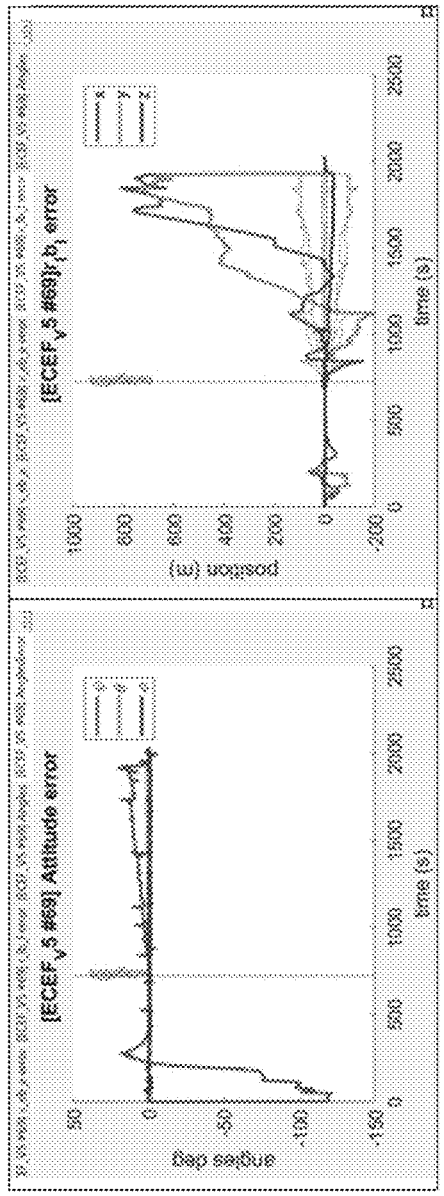
FIG. 6A
FIG. 6B
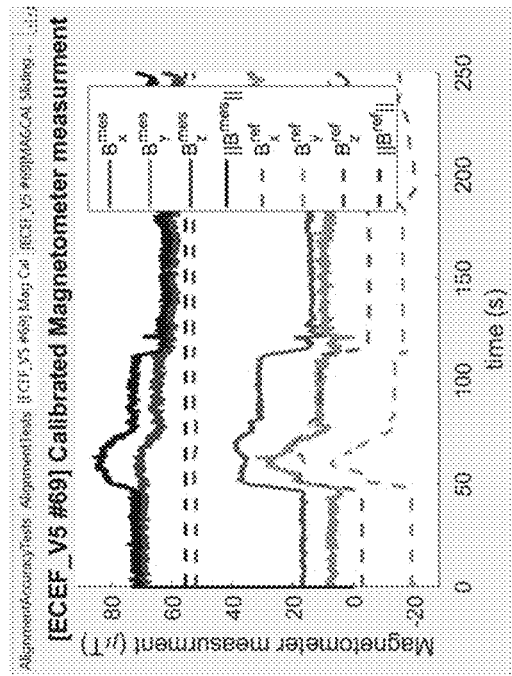
FIG. 7A

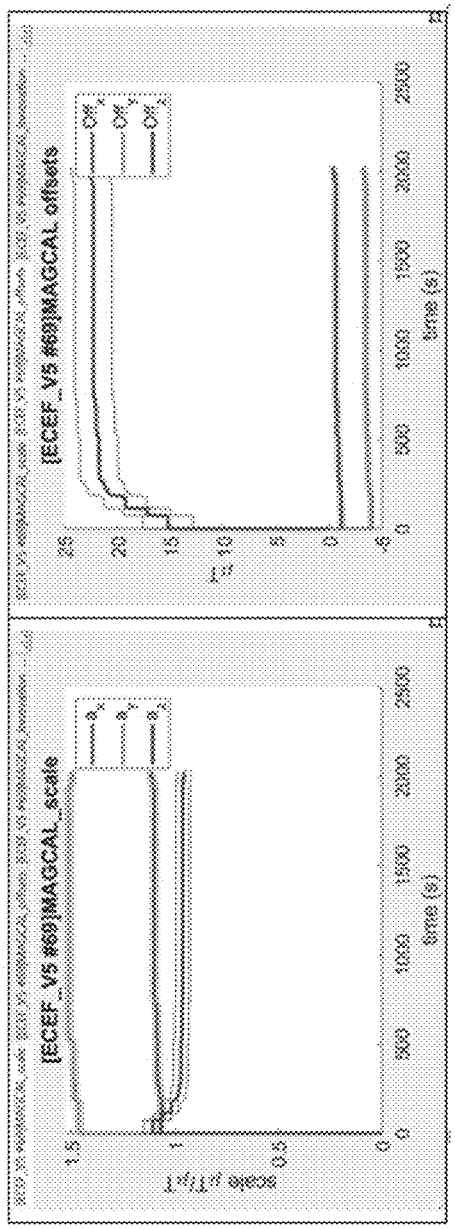
FIG. 7B
FIG. 7C
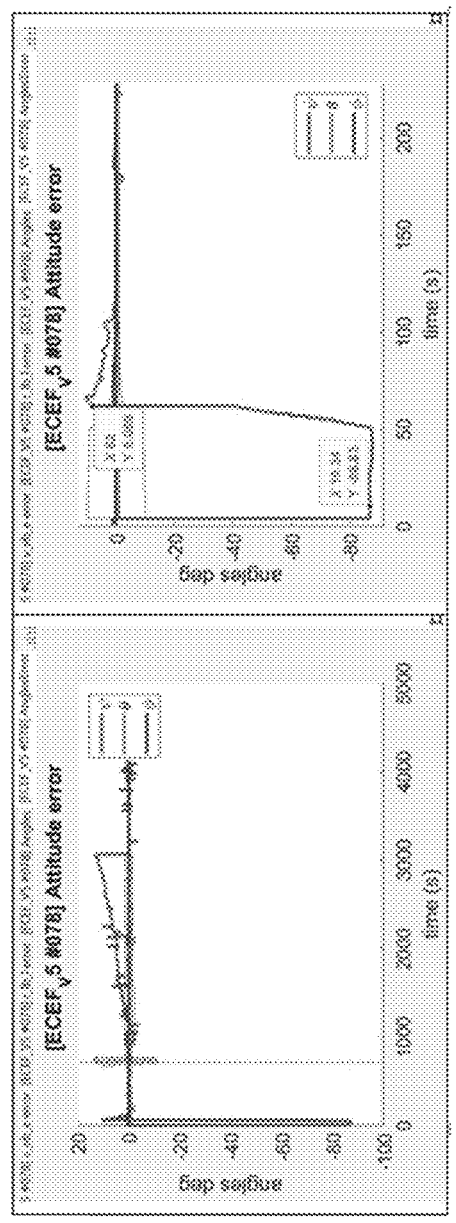
FIG. 8A
FIG. 8B

METHODS FOR INITIALIZING A NAVIGATION SYSTEM WITHOUT HEADING INFORMATION AND DEVICES THEREOF

FIELD

This technology relates to methods for initializing a navigation system, such as an Inertial Navigation System (INS)/Global Navigation Satellite System (GNSS), without heading information and devices thereof.

BACKGROUND

Strapdown inertial navigation performance, in for example an Inertial Navigation System (INS)/Global Navigation Satellite System (GNSS), requires good initialization data, such as position, velocity, and attitude, to function. Usually position data can be initialized by the GNSS or last known position from a previous run stored in a non-volatile or other memory. Additionally, velocity data is given by GNSS or may be assumed to be zero since a vehicle usually starts from a stationary position. Pitch and roll are initialized by an accelerometer leveling with a gravity vector, but heading is hardly initialized without the use of other sensors, such as for example, a magnetometer, a dual antenna GNSS, a gyrocompass, and a perception sensor, such as camera, laser, radar, etc.

Accordingly, with prior technologies other sensors are required for initialization of heading, but unfortunately there can be issues and/or other complexities with using these other sensors for initializing heading. For example, when the other sensor for initializing heading is a magnetometer, the magnetometer is prone to disturbances when there are ferrous objects nearby. In another example, when the other sensor for initializing heading is a dual antenna GNSS, the dual antenna GNSS requires more complex settings and the presence of a valid GNSS signal. In another example, when the other sensor is a perception sensor, such as camera, laser, or radar, these sensors also require complex settings and calibrations. In yet another example, when the other sensor for initializing heading involves a gyrocompass. Gyrocompassing only works with a high-performance navigation grade Inertial Measurement Units (IMUs). Moreover, gyrocompassing requires the navigation system to be stationary for a period of time depending on the quality of the gyroscope and the latitude of the object. Unfortunately, such a stationary condition may not be met in some critical applications which require the determination of a heading calibration in a dynamic mode.

SUMMARY

A method for initializing a navigation system without heading information includes initiating, by a computing device, determination of navigation with an initial heading while in motion and without waiting for a stationary phase. Ongoing position-dependent data and/or velocity-dependent data of an object is/are received, by the computing device, from a Global Navigation Satellite System (GNSS) receiver system or a position fixing system and from an inertial measurement unit (IMU). A weight associated with each of a plurality of filters is iteratively determined, by the computing device, in an adaptive estimation model based on a match between position data and velocity data for each of the plurality of the filters conditioned by filter heading data for each of the plurality of the filters and the ongoing obtained position data and the velocity data of the object. An estimated heading of the object is determined, by the computing device, based on the initial heading and the iteratively determined weight and the filter heading data associated with the one or more of the filters.

A non-transitory computer readable medium having stored thereon instructions comprising executable code which when executed by a processor, causes the processor to initiate determination of navigation with an initial heading while in motion and without waiting for a stationary phase. Ongoing position-dependent data and/or velocity-dependent data of an object is/are received from a Global Navigation Satellite System (GNSS) receiver system or a position fixing system and from an inertial measurement unit (IMU). A weight associated with each of a plurality of filters is iteratively determined in an adaptive estimation model based on a match between position data and velocity data for each of the plurality of the filters conditioned by filter heading data for each of the plurality of the filters and the ongoing obtained position data and the velocity data of the object. An estimated heading of the object is determined based on the initial heading and the iteratively determined weight and the filter heading data associated with the one or more of the filters.

A computing apparatus includes a memory coupled to the processor which is configured to be capable of executing programmed instructions stored in the memory to initiate determination of navigation with an initial heading while in motion and without waiting for a stationary phase. Ongoing position-dependent data and/or velocity-dependent data of an object is/are received from a Global Navigation Satellite System (GNSS) receiver system or a position fixing system and from an inertial measurement unit (IMU). A weight associated with each of a plurality of filters is iteratively determined in an adaptive estimation model based on a match between position data and velocity data for each of the plurality of the filters conditioned by filter heading data for each of the plurality of the filters and the ongoing obtained position data and the velocity data of the object. An estimated heading of the object is determined based on the initial heading and the iteratively determined weight and the filter heading data associated with the one or more of the filters.

This technology provides a number of advantages including providing methods and devices for initializing strapdown inertial navigation with navigation systems, such as an Inertial Navigation System (INS)/Global Navigation Satellite System (GNSS), without heading information. With this technology, additional sensors, such as a magnetometer, a dual antenna GNSS, or a gyrocompass, which can introduce issues and/or other complexities and costs are not required. With this technology, accurate estimated heading information may be obtained with lower cost inertial measurement units (IMUs) which may not utilize or have the other additional sensors discussed earlier. With this technology, the system can start navigating in motion without the need to wait for a stationary phase as required in gyrocompassing and magnetometer. With this technology, a heading is quickly estimated with satisfactory accuracy especially when the system is restarted.

BRIEF DESCRIPTION OF THE DRAWINGS

FIGS. 4A and 4B are graphs of an example of an attitude comparison with reference (left) and attitude errors (right) for an example using the exemplary MMAE shown in FIG. 2 with twelve filters to recalibrate the heading $\psi$ (red curves);

FIGS. 5A and 5B are graphs of examples of attitude errors and position errors for a whole trajectory for the example shown in FIGS. 4A and 4B;

FIGS. 6A and 6B are graphs of examples of attitude and position errors for the example shown in FIGS. 4A and 4B when a magnetometer is used to initialize the heading;

FIGS. 7A-7C are graphs of examples illustrating a failure of the magnetometer used to initialize the heading for the example shown in FIGS. 4A and 4B due to the bad estimation of hard-iron offsets; and FIGS. 8A and 8B are graphs of another example of attitude error during a test and during a first 200 seconds.

DETAILED DESCRIPTION

Figure 1:
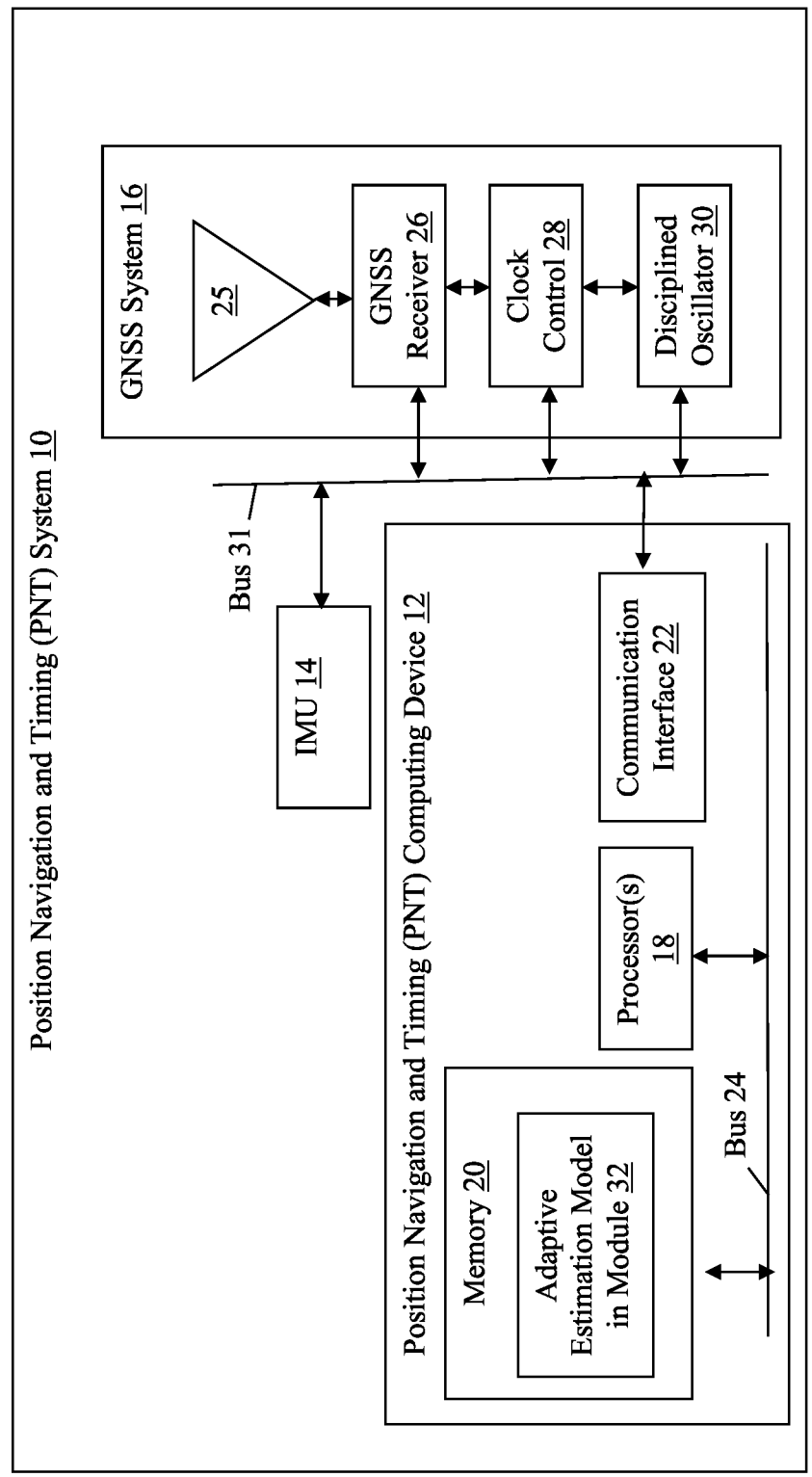
FIG. 1 is a block diagram of an example of an environment with an exemplary positioning, navigation and timing (PNT) computing device.

An example of an environment with an exemplary positioning, navigation and timing (PNT) system 10 is illustrated in FIG. 1. In this example, the positioning, navigation and timing (PNT) system 10 includes a PNT computing device 12, an inertial measurement unit (IMU) 14, and a Global Navigation Satellite System (GNSS) system 16, although the system may have other types and/or other numbers of systems, devices, components or other elements in other configurations. This technology provides a number of advantages including providing methods and devices for initializing strapdown inertial navigation with navigation systems, such as an Inertial Navigation System (INS)/Global Navigation Satellite System (GNSS), without heading information.

Referring more specifically to FIG. 1, the PNT computing device in this example includes at least one processor, memory, a communication interface which are coupled together by a bus or other communication link, although the PNT computing device can include other types and/or numbers of elements in other configurations.

The processor of the PNT computing device may execute programmed instructions stored in the memory for the any number of the functions or other operations illustrated and described by way of the examples herein. The processor of the PNT computing device may include one or more CPUs or other processors with one or more processing cores, for example, although other types of processor(s) can also be used.

The memory of the PNT computing device stores these programmed instructions and/or other data for one or more aspects of the present technology as illustrated and described herein, although some or all of the programmed instructions could be stored elsewhere. A variety of different types of memory storage devices, such as random access memory (RAM), read only memory (ROM), hard disk (HDD), solid state drives (SSD), flash memory, or other computer readable medium which is read from and written to by a magnetic, optical, or other reading and writing system that is coupled to the processor(s), can be used for the memory.

Accordingly, the memory of the PNT computing device can store application(s) that can include executable instructions that, when executed by the user equipment computing device, cause the PNT computing device to perform actions, such as to transmit, receive, or otherwise process signals related to navigation or other positioning and to perform other actions illustrated and described by way of the examples herein with reference to FIGS. 1-6B and 7A-8B. The application(s) can be implemented as modules or components of other application(s). Further, the application(s) can be implemented as operating system extensions, modules, plugins, or the like. In this particular example, the memory includes an adaptive estimation module 32 that includes an algorithm for an adaptive estimation model along with other programmed instructions to initialize a navigation system, such as an Inertial Navigation System (INS)/Global Navigation Satellite System (GNSS) or other position fixing system, such as proximity systems, ranging systems, angular positioning systems, pattern matching systems, or Doppler positioning systems by way for example only, without heading information as illustrated and described by way of the examples herein.

The communication interface of the PNT computing device operatively couples and communicates between the PNT computing device and the IMU 14 and the GNSS system 16 by a bus 31, although other types and/or numbers of connections and/or configurations to other devices and/or elements can be used. By way of example only, the communication network(s) can include local area network(s) (LAN(s)) or wide area network(s) (WAN(s)), and/or wireless networks by way of example only, although other types and/or numbers of protocols and/or communication networks can be used.

The inertial measurement unit (IMU) 14 is an electronic device that measures and reports a body's specific, angular rate, and sometimes the orientation of the body, using a combination of accelerometers, gyroscopes, and in some examples magnetometers, although other types of IMUs may be used. In this example, an IMU without a magnetometer or other additional sensor is used to further reduce the cost of examples of this technology while still maintaining heading accuracy. Additionally, in this example the IMU 14 is illustrated separate from the PNT computing device 12 and connected by a bus 31, although the IMU 14 may be incorporated within the PNT computing device 12 and/or may be coupled to the PNT computing device 12 in other wired or wireless manner via other types of network connections.

The GNSS system 16 includes a GNSS receiver 26 with a single antenna 25 in this example, a control clock device 28 and a GNSS disciplined oscillator 30 which are coupled together and are configured to operate as a GNSS receiver timing device, although other types of receiver devices external or internal in the PNT computing device 12 may be used. The GNSS receiver is configured to capture signals, such as data packets, from GNSS satellites when navigation or other positioning is to be determined, although other types of receivers may be used. In this example, the GNSS disciplined oscillator is an oscillator whose output is controlled to agree with the signals broadcast by GNSS satellites, although other types of controlled or disciplined oscillators or other timing elements with similar accuracy may be used. In this example, the GNSS disciplined oscillator is an oscillator with at least about $10^{-6}$ stability to provide in these examples the necessary accuracy for the calculated measurements, although other stability ranges may be used. By way of example only, the GNSS disciplined oscillator 30 may be a TCXO—Temperature Compensated quartz crystal Oscillator with at least about $10^{-6}$ stability, an OCXO—Oven Controlled quartz crystal Oscillator with about a $10^{-8}$-$10^{-10}$ stability, or an Atomic Oscillator with about a $10^{-11}$-$10^{-12}$ stability. In this example, the PNT computing device 12 can receive and process broadcast signals for positioning and navigation from one or more GNSS satellite transmitters or other position fixing systems or methods, such as proximity, ranging, angular positioning, pattern matching, or Doppler positioning by way of example only.

Although the user equipment computing device, the GNSS satellite transmitters (1-n), attacker equipment computing device, and optional UTC source are illustrated and described in the illustrative examples herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

Portions of all of the examples of the technology illustrated and described herein may also be embodied as one or more non-transitory computer readable media having instructions stored thereon for one or more aspects of the present technology. The instructions in some examples include executable code that, when executed by the processor of the user equipment computing device, cause the processor to carry out steps necessary to implement the methods of the examples of this technology that are illustrated and described herein.

An exemplary method for initializing a navigation system, such as an Inertial Navigation System (INS)/Global Navigation Satellite System (GNSS), without heading information will now be described with reference to FIGS. 1-3. In this example, the method for initializing INS/GNSS using only information from a lower grade IMU 14 and a single antenna GNSS receiver system 16, although other types of IMUs and/or positioning systems, such as systems that use proximity, ranging, angular positioning, pattern matching, or Doppler positioning, etc. by way of example, may be used.

Figure 2:
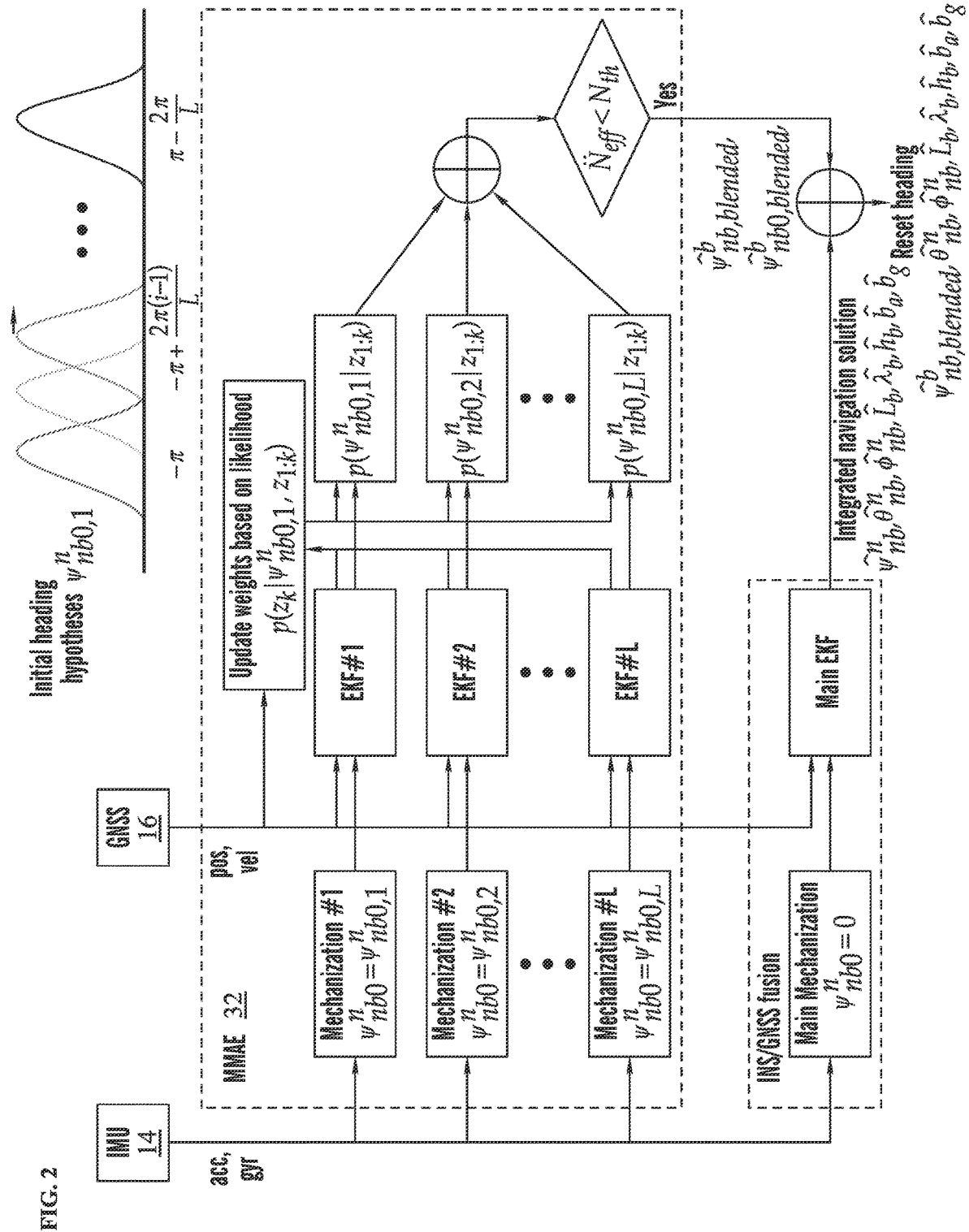
FIG. 2 is a functional block diagram of a Multiple Model Adaptive Estimation (MMAE) algorithm for execution by the PNT computing device with inputs from an inertial measurement unit (IMU) and from for example a Global Navigation Satellite System (GNSS)
Figure 3:
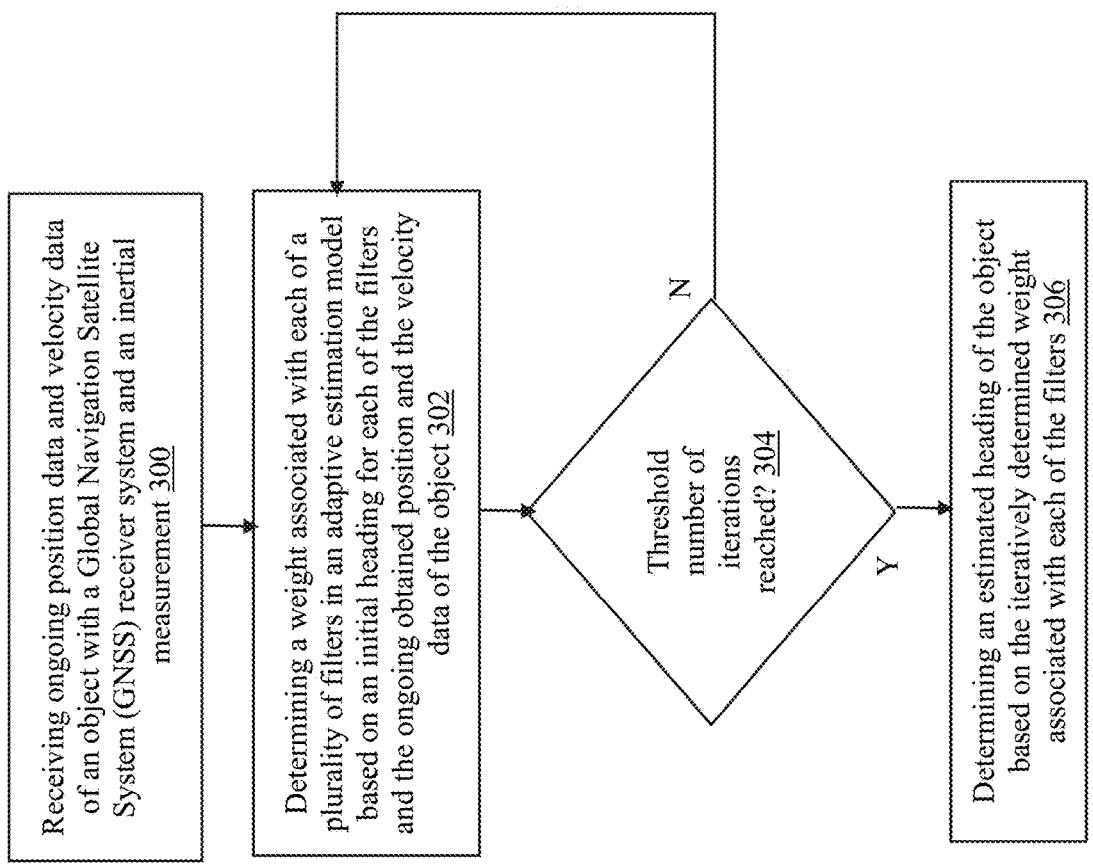
FIG. 3 is a flowchart of an example of initializing a navigation system, such as an Inertial Navigation System (INS)/Global Navigation Satellite System (GNSS), without heading information.

Referring more specifically to FIG. 3, in step 300 the PNT system 10, comprising the PNT computing device 12, the IMU 14, and the GNSS system 16 in this example, may be, mounted or otherwise coupled or associated with an object, such as an airplane or other vehicle by way of example only, that requires initialization for navigation. When the object begins to move, the PNT computing device 12 begins to receive ongoing velocity data ("vel") and position data ("pos") of an object from the Global Navigation Satellite System (GNSS) receiver system 12 and accelerometer data ("acc") and gyroscope data ("gyr") from the IMU 14 as shown in FIG. 2, although the velocity data and/or position data may be obtained in other manners and/or other types of data may be received.

In step 302, the PNT computing device 12 may determine a weight associated with each of a plurality of filters in an adaptive estimation model in module 32 based on an initial heading for each of the filters and the ongoing obtained position ("pos") and the velocity ("vel") data of the object and accelerometer measurements ("acc") and gyroscope measurements ("gyr") from the inertial measurement unit 14 as shown in FIG. 2, although other manners for applying the adaptive estimation model. In this example, the initial heading data is unknown and a guess of a value for this initial heading data is made by employing a Multiple Model Adaptive Estimation (MMEA) method in the adaptive estimation model in module 32. In particular, in this example, a bank of extended Kalman filters (EKFs) are utilized and their initial heading values are equally distributed over 360°. By way of example, a band of 12 EKFs has −180°, −150°, −120°, −90°, −60°, −30°, 0°, 30°, 60°, 90°, 120°, and 150° headings for each sub-filter i with equal probability $w_{0,i}=1/12$, but other numbers of bands may be used. The larger the number of bands, the higher the accuracy of this example of the method, but increasing the number of bands requires more processing power. In addition, if given prior heading information, the initial headings of a bank of filters can be either uniformly or nonuniformly distributed over the ranges of interest which can be smaller than three hundred and sixty degrees.

When the object with the PNT system 10, comprising the PNT computing device 12, the IMU 14, and the GNSS system 16 in this example moves, the GNSS position and velocity sequences can be used to update a weight $w_{i,k}$ of each sub-filter i as follows:

$$w_{k,i} = \frac{p(z_k \mid \psi_{nb0,i}^n, z_{1:k}) w_{k-1,i}}{\sum_i p(z_k \mid \psi_{nb0,i}^n, z_{1:k}) w_{k-1,i}} \quad (1)$$

where $w_{k,i}$ is the weight of sub-filter i at epoch k, $\psi_{nb0,i}^n$ its initial heading, $z_k$ the observation vector, and $z_{1:k}=\{z_1, z_2, \ldots, z_k\}$. $z_k$ herein includes GNSS position and velocity measurements or other types of measurements containing position and velocity information Note that throughout the subscripts b and n denote body and local navigation frames, respectively, and subscript 0 presents the initial value of the corresponding variable. For instance, $\psi_{nb0}^n$ is the initial (subscript 0) heading $\psi$ of body frame (subscript b) with respect to local navigation frame (subscript n) and resolving in local navigation frame (superscript n).

The likelihood function in (1) is given as:

$$p(z_k \mid \psi_{nb0,i}^n, z_{1:k}) = \frac{1}{\sqrt{(2\pi)^m |H_{k,i} P_{k,i}^- H_{k,i}^T + R_k|}} \exp\left(-\frac{1}{2} \delta z_{k,i}^{-T} (H_{k,i} P_{k,i}^- H_{k,i}^T + R_{k,i})^{-1} \delta z_{k,i}^-\right), \quad (2)$$

where m denotes the dimension of $z_k$, $H_{k,i}$ the measurement matrix, $P_{k,i}^-$ the propagated state covariance matrix, $R_{i,k}$ the noise covariance matrix, and $\delta z_{k,i}^-$ the measurement innovation vector. These matrices H, P, and R describe the Extended Kalman Filter of the system. FIG. 2 shows how the accelerometer and gyroscope data ("acc") ("gyr") from the IMU 14 and the position and velocity data ("pos") ("vel") from the GNSS System 16 are inputs to the processing elements of the MMAE 32.

In step 304, the PNT computing device 12 may optionally determine if a threshold number of iterations of determining a weight associated with each of a plurality of filters in an adaptive estimation model has been reached, although in other examples this step may not be required. In this example, after some number of iterations, a few weights are updated and thus become dominant in comparison with the others. By monitoring the weights of each sub-filter and comparing them with a predefined threshold by the PNT computing device 12, a criterion may be introduced to stop the heading calibration when it converges.

In this example, the predefined threshold is fine-tuned by the PNT computing device 12 to stop the algorithm for the MMAE in module 32 before losing the diversity of the weights (similar to the particle depletion in particle filtering). Inspired by particle filtering, the MMAE in module 32 is supposed to converge in this example when the following condition is met:

$$\frac{1}{\sum_i w_{k,i}^2} < N_{th}, \quad (3)$$

where $N_{th}$ is a predefined threshold and usually a fraction of the size of filter bank L i.e., $N_{th} = \gamma L$.

Accordingly, if in step 304, the PNT computing device 12 determines that the threshold number of iterations has not been reached or converged, then the No branch is taken back to step 302. If in step 304, the PNT computing device 12 determines that the threshold number of iterations has been reached or has converged, then the Yes branch is taken back to step 306.

In step 306, the PNT computing device 12 may determine an estimated current heading of the object based on the iteratively determined weight associated with each of the filters and their heading data. In the first exemplary implementation (E1), after a few iterations of determining each weight, the initial heading estimate $\hat{\psi}_{nb0}^n$ can be determined by the PNT computing device 12 by examining the initial heading given to the one of the sub-filters whose weight is largest (or computing the weighted mean of all initial headings). If there was an erroneous initial heading value, then the PNT system 10 can be reinitialized by replaying the sequential estimations from the beginning until the current epoch with the new initial heading in the condition that all the observations are stored. In the second exemplary implementation (E2), the current heading estimate $\hat{\psi}_{nb,k}^n$ can be directly determined by the PNT computing device 12 by examining the current heading output of one of the sub-filters whose weight is largest (or computing the weighted mean of all current headings). This determined current heading is then overwritten as the current heading of the PNT system 10.

In (E1), reinitializing of the PNT system 10 can be done by replaying the sequential estimation from the beginning until the current epoch as described in the steps above, although other options may be used. For example, the PNT computing device 12 may determine an estimated initial heading of the object based on an average of the initial headings of the filters each adjusted based on a corresponding one of the iteratively determined weights, although other manners for determining the estimated heading may be used. In this example, the initial heading value is determined by the PNT computing device 12 by the current averaged/blended initial heading estimates $\hat{\psi}_{nb0,blended}^n$ of all the sub-filter as follows:

$$\hat{\psi}_{nb0,blended}^n = \sum_i \hat{\psi}_{nb0,i}^n w_{k,i}.$$

where $\hat{\psi}_{nb0,i}^n$ is the initial heading given to the sub-filter i. Note that the (4) is approximate. The exact solution lies in computing the weighted mean of full rotation matrix or quaternion.

Similarly, the current heading estimate is given as:

$$\hat{\psi}_{nb,k}^n \approx \sum_i \hat{\psi}_{nb,k,i}^n w_{k,i}. \quad (4)$$

where $\hat{\psi}_{nb,k,i}^n$ is the initial heading estimate of sub-filter i at epoch k.

In yet another example, the PNT computing device 12 may determine an estimated current heading of the object based on the initial or current heading of one of the filters with a highest probability of accuracy based on the iteratively determined weights and at least one programmed detection rule defined by a probability of a false alarm, although other manners for determining the estimated heading may be used. In this example, a true heading typically lies between the two potential values given by two of the sub-filter. Thus, in this example to avoid wrong selection, the sub-filter is chosen by the PNT computing device 12 based on a detection rule defined by a probability of false alarm for example.

Example 1

A prototype of the PNT system 10 that combines signals from an IMU 14 and a single frequency GNSS receiver system 16 was tested. The performance was benchmarked by comparing with ground truth provided by a real-time kinematic (RTK) receiver. Drive tests were conducted on suburban streets in Rochester N.Y. (latitude 43° N) in order to evaluate the solution. A couple of test examples are chosen to present.

Referring to FIGS. 4A and 4B, graphs of an example of attitude comparison with reference (left) and attitude errors (right) for this first example using a 12-filter MMAE in module 32 to recalibrate the heading $\psi$ (red curves) are illustrated. The true initial heading was about 89° while the PNT system 10 was being initialized with the north direction leading to the heading error at the beginning of about −89°. The MMAE algorithm in module 32 was able to reset the error after 52 seconds of processing (8.5 deg error at t=52 s). Note that the vehicle with the PNT system 10 starts to run at t=44 s that heading is observable; thus, MMAE only needs 8 s to calibrate);

Referring to FIGS. 5A and 5B, examples of graphs of attitude errors and position errors for the whole trajectory in this first example are illustrated. This test run exhibits a very long outage about 1200 s which results in a large position drift. Next, this the solution with this first example of the PNT system 12 was compared with another system that used a magnetometer to initialize the heading.

Referring to FIGS. 6A and 6B, examples of graphs of attitude and position errors for the first example using the magnetometer to initialize the heading. This example illustrates that the magnetometer fails to get the initial heading (>100 deg error at the beginning in left sub-figure). As a result, the position error is much larger than that with the example of the PNT system 12 with the MMAE in module 32 as shown in FIGS. 4A-5B.

Referring to FIGS. 7A-7C, additional graphs illustrating the failure of the system with the magnetometer to initialize the heading due to the bad estimation of hard-iron offsets. In particular, FIGS. 7A-7C illustrate graphs of calibrated magnetometer measurement, scale and offset estimations for this first example. The graph in FIG. 7A compares the magnetometer measurement (i.e., total magnetic flux density) with the reference (calculated by ground truth heading and an earth magnetic model like IGRF). This graph shows that there are offsets in magnetometer measurements that are not compensated. The graphs in FIGS. 7B and 7C present the estimated soft-iron scales and hard-iron offsets which are prone to errors in case iron objects are surrounded.

Example 2

Referring to FIGS. 8A and 8B, graphs of attitude error during a whole test (left) and during the first 200 s (right) are illustrated in a second example. In this second example with PNT system 10, the true initial heading was about 87° and the main EKF is initialized with the North leading to −87° heading error. At t=62 s, the MMAE corrects the main EKF leading to heading error of 8 deg.

Accordingly, as illustrated and described by way of the examples herein, this technology provides a number of advantages including providing methods and devices for initializing aided strapdown inertial navigation with navigation systems, such as an Inertial Navigation System (INS)/Global Navigation Satellite System (GNSS), without heading information. With this technology, additional sensors, such as a magnetometer, a dual antenna GNSS, or a gyrocompass, which can introduce issues and/or other complexities and costs are not required. With this technology, accurate estimated heading information may be obtained with lower cost inertial measurement units (IMUs) which may not utilize or have the other additional sensors discussed earlier.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for initializing an aided inertial navigation system (INS) without initial heading information, the method comprising:
    initiating, by a computing device, determination of navigation with an initial heading while in motion and without waiting for a stationary phase;
    receiving, by the computing device, at least one of ongoing position-dependent data or velocity-dependent data of an object from a Global Navigation Satellite System (GNSS) receiver system or a position fixing system and accelerometer data and gyroscope data from an inertial measurement unit (IMU);
    iteratively determining, by the computing device, a weight associated with each of a plurality of filters in an adaptive estimation model based on a match between position data and velocity data for each of the plurality of filters conditioned by filter heading data for each of the plurality of the filters and the ongoing obtained position data and the velocity data of the object and the accelerometer data and gyroscope data; and
    determining, by the computing device, an estimated heading of the object based on the initial heading and the iteratively determined weight and the filter heading data associated with the one or more of the filters chosen by at least one programmed detection rule defined by a probability of a false alarm.

2. The method as set forth in claim 1 wherein the plurality of filters in the adaptive estimation model comprises a plurality of recursive filters.

3. The method as set forth in claim 2 wherein the initial heading data of each of a plurality of recursive filters are uniformly distributed over three hundred sixty degrees.

4. The method as set forth in claim 2 wherein the initial heading data of each of a plurality of recursive filters are uniformly distributed over one or more ranges of interest smaller than three hundred sixty degrees when the initial heading comprises a prior given initial heading.

5. The method as set forth in claim 2 wherein the initial heading data of each of a plurality of recursive filters are non-uniformly distributed over three hundred sixty degrees or over one or more ranges smaller than three hundred sixty degrees according to a predefined distribution.

6. A non-transitory computer readable medium having stored thereon instructions comprising executable code which when executed by a processor, causes the processor to:
    initiate determination of navigation with an initial heading while in motion and without waiting for a stationary phase;
    receive at least one of ongoing position-dependent data or velocity-dependent data of an object from a Global Navigation Satellite System (GNSS) receiver system or a position fixing system and accelerometer data and gyroscope data from an inertial measurement unit (IMU);
    iteratively determine a weight associated with each of a plurality of filters in an adaptive estimation model based on a match between position data and velocity data for each of the plurality of the filters conditioned by filter heading data for each of the plurality of the filters and the ongoing obtained position data and the velocity data of the object and the accelerometer data and gyroscope data; and
    determine an estimated heading of the object based on the initial heading and the iteratively determined weight and the filter heading data associated with the one or more of the filters chosen by at least one programmed detection rule defined by a probability of a false alarm.

7. The medium as set forth in claim 6 wherein the plurality of filters in the adaptive estimation model comprise a plurality of recursive filters.

8. The medium as set forth in claim 7 wherein the initial heading data of each of a plurality of recursive filters are uniformly distributed over three hundred sixty degrees.

9. The medium as set forth in claim 7 wherein the initial heading data of each of a plurality of recursive filters are uniformly distributed over one or more ranges of interest smaller than three hundred sixty degrees when the initial heading comprises a prior given initial heading.

10. The medium as set forth in claim 7 wherein the initial heading data of each of a plurality of recursive filters are non-uniformly distributed over three hundred sixty degrees or over one or more ranges smaller than three hundred sixty degrees according to a predefined distribution.

11. A computing apparatus comprising:
    a processor; and
    a memory coupled to the processor which is configured to be capable of executing programmed instructions stored in the memory to:

initiate determination of navigation with an initial heading while in motion and without waiting for a stationary phase;

receive at least one of ongoing position-dependent data or velocity-dependent data of an object from a Global Navigation Satellite System (GNSS) receiver system or a position fixing system and accelerometer data and gyroscope data from an inertial measurement unit (IMU);

iteratively determine a weight associated with each of a plurality of filters in an adaptive estimation model based on a match between position data and velocity data for each of the plurality of the filters conditioned by filter heading data for each of the plurality of the filters and the ongoing obtained position data and the velocity data of the object and the accelerometer data and gyroscope data; and determine an estimated heading of the object based on the initial heading and the iteratively determined weight and the filter heading data associated with the one or more of the filters chosen by at least one programmed detection rule defined by a probability of a false alarm.

12. The device as set forth in claim 11 wherein the plurality of filters in the adaptive estimation model comprises a plurality of recursive filters.

13. The device as set forth in claim 12 wherein the initial heading data of each of a plurality of recursive filters are uniformly distributed over three hundred sixty degrees.

14. The device as set forth in claim 12 wherein the initial heading data of each of a plurality of recursive filters are uniformly distributed over one or more ranges of interest smaller than three hundred sixty degrees when the initial heading comprises a prior given initial heading.

15. The device as set forth in claim 12 wherein the initial heading data of each of a plurality of recursive filters are non-uniformly distributed over three hundred sixty degrees or over one or more ranges smaller than three hundred sixty degrees according to a predefined distribution.

* * * * *